Feb. 7, 1928.
E. P. HILL
1,658,559
MOTOR SUPPORT
Filed May 29, 1926
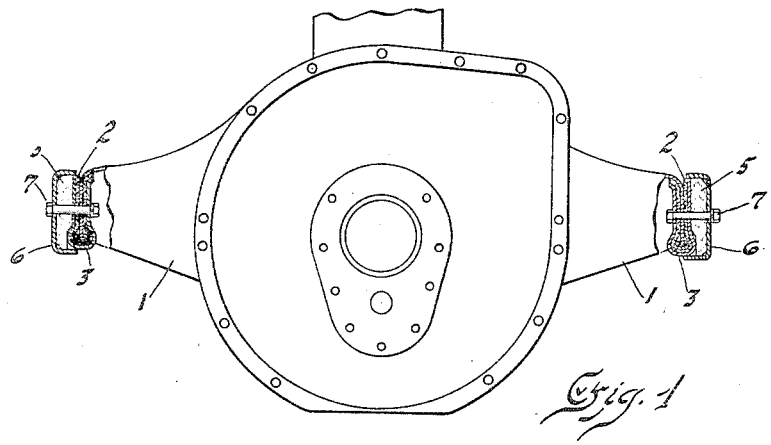
Fig. 1
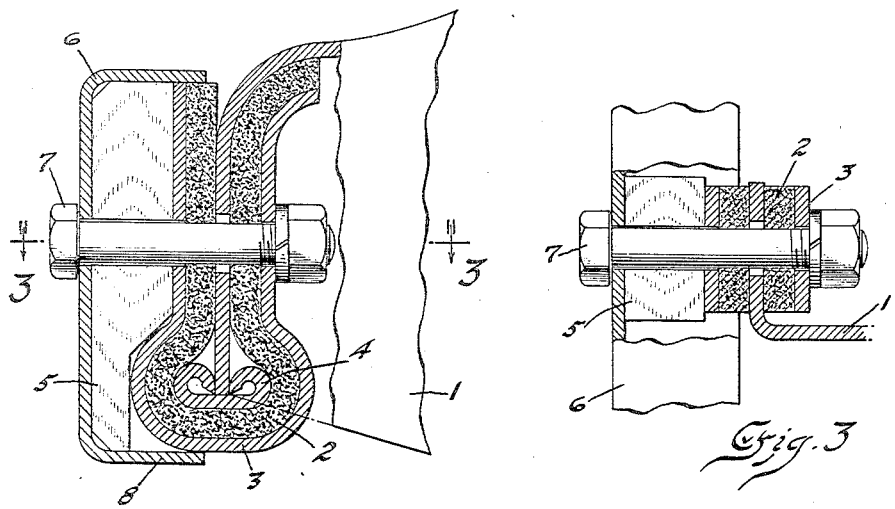
Fig. 2
Fig. 3
Inventor
Edwin P. Hill
By Blackmore, Spencer & Hill
Attorney Patented Feb. 7, 1928.

1,658,559

UNITED STATES PATENT OFFICE.

EDWIN P. HILL, OF DETROIT, MICHIGAN, ASSIGNOR TO GENERAL MOTORS CORPORATION, OF DETROIT, MICHIGAN, A CORPORATION OF DELAWARE.

MOTOR SUPPORT.

Application filed May 29, 1926. Serial No. 112,634.

This invention relates to mountings and more particularly to a cushioned or vibration absorbing support whereby vibrations will be deadened or absorbed, thus freeing a main supporting frame of strains and obviating the resultant injuries and disadvantages.

While the invention will be described as applied to an engine mounting for automobiles, such application is mainly for illustrative purposes, and there is no desire to limit the application to such use alone, as it may be applied to other uses where it is desirable to employ a cushioned or vibration absorbing mounting.

Motor vibration, as well as shocks and strains incident to traveling vehicles, has a somewhat damaging effect by placing strains on various parts and inducing breakage. It is customary to mount the internal combustion engine for automobiles at three points on the frame of the vehicle. Two of these suspension points are side supports located at approximately the center of gravity of the engine, so that the bulk of the weight is carried by the side supports. The remaining suspension point is generally at the center and front of the engine and serves particularly as a means for aligning the engine. As applied to such engine mountings, this invention has to do chiefly with the rear or load carrying points at the sides. However, it is to be understood that the construction is not only usable with three-point suspension, but it may also be employed on other types of motor supports.

The object of the invention is to provide an improved form of resilient mounting whereby vibrations will be absorbed.

A further object is to provide an improved connection between the chassis frame and engine supporting bracket.

A further object is to provide a cheap, simple but efficient connection which will be easy to assemble, conducive to better motor operation, and unlikely to get out of repair.

Referring to the drawings—

Figure 1 is a fragmentary transverse view of an automobile internal combustion engine mounted on the chassis, illustrating the relation of the parts and showing the resilient motor support connections in section;

Figure 2 is a transverse sectional view of the connection forming the subject matter of the present invention; and Figure 3 is a longitudinal section taken on line 3—3 of Figure 2.

Like parts are indicated by similar characters of reference throughout the several views.

In the drawings, the numeral 1 represents the rear mounting bracket for an engine. One end of this bracket is fixedly attached to the engine, while the other end is resiliently mounted or attached to the chassis frame. This resilient connection consists of a strip of rubber or other elastic material 2 placed about the end of the bracket and held in place by means of a retainer 3 which is preferably, though not necessarily, stamped from sheet metal into substantially U-shape with open sides, which permits displacement of the elastic material under compression. This rubber strip 2 receives and absorbs the strains and vibrations, both sidewise as well as downward. The top inner side of the U-shaped retainer is provided with an inwardly flared end conforming to the curvature of the motor supporting bracket arm, and the rubber strip extends laterally in such flared end. The rubber strip being looped around the bottom of the bracket, the entire down thrust or weight of the engine is carried on the cushioning strip, distributed between the bottom and the in-turned top, the bulk of the weight being carried on the rubber strip in the bottom of the retainer augmented by that in the flared in-turned upper end. To obviate sharp corners on the bottom of the bracket and distribute the load over a greater area of the rubber than the width of the bracket, there is provided a small plate 4 on which the bracket 1 rests, and which has its ends turned upwardly and inwardly to afford a round smooth surface with the ends abutting the bracket wall. Thus the down thrust or weight of the engine is carried through the bracket by the plate 4 and distributed over a wide area of the resilient material eliminating the sharp narrow end of the motor bracket cutting into the resilient material. The retainer 3 is correspondingly enlarged at this point as is shown in Figure 2

An additional strain or vibration absorbing member is provided in the form of a block 5 preferably of wood, leather, fabric or other material of suitable characteristics to withstand hard usage and of low cost, which is inserted within the channeled main frame 6, and against which the retainer 3 abuts. The bottom or lower end of the block 5 is cut away to provide a recess into which the enlarged bottom of the retainer projects.

The entire load or weight of the engine is carried upon the strip of rubber packing and is cushioned thereon. The rubber packing in its retainer 3 rests upon the lower flange 8 of the channeled frame. Thus the flange 8 supports the load after the vibrations have been absorbed by the rubber cushion or packing.

A stud or bolt 7 extends through the parts to hold them in place. The sole function of this stud is that of anchoring the elements one to another. It has no supporting function and does not receive or bear any of the down thrust or weight of the engine. To this end the holes through the elements are made, as shown in the drawing, slightly larger than the diameter of the bolt, with the hole in the supporting motor bracket 3 of greater diameter than the remaining holes, thus insuring that the bracket will not rest upon the stud even when the rubber strip is greatly compressed under the load.

The particular form of central or front alignment support to be employed is not material, and the description and drawing have been limited to the rear supports.

Resilient mountings and couplings have been found to possess great merit and are coming into quite general usage wherever the presence of vibration tends to cause breakage. This is particularly true of motor supports and for that reason the present connection was so described. However, the invention is also usable as a support in other connections, such as for automobile bodies, spring shackles and the like.

While the elements have been described in more or less detail, it is to be understood that the invention is not limited to the specific form shown, but various obvious modifications may be employed without departing from the spirit or scope of the invention as set forth in the following claims.

Having described my invention, I claim:

1. The combination with a supported member and a supporting main frame of channel section, of a cushioned suspension including a channeled member resting on the bottom flange of the supporting frame, resilient cushioning material therein, a flat plate resting on the cushioning material, on which the supported member bears, whereby the load will be distributed over the entire area of the cushion material under the plate.

2. The combination with a supported member and a supporting main frame of channel section, of a cushioned suspension including a resilient material, a retainer for the resilient material resting on the lower flange of the channeled main frame, a bracket arm on the supported member extending within the resilient material and supported thereon, the retainer and bracket arm having holes therein for the passage of a bolt to anchor the suspension to the main frame, the holes being of larger diameter than the bolt, whereby the bolt is relieved of down thrust.

3. The combination with a supported member and a supporting main frame of channel section, of a cushioned suspension including a channeled member, supported on the lower flange of the supporting frame, an arm on the supported member extending within the channel member, a body of cushioning material interposed between the arm and channel member, a body of vibration absorbing material between the frame and the channel member, the fastening means adapted to secure said channel member to the frame and hold said arm against dislodgment from within the channel member.

4. The combination with a supported member and a supporting main frame, of a suspension comprising a substantially U-shaped member resting on the main frame, a vibration absorbing block between the frame and U-shaped member, and cushioning material within the U-shaped member, in which the supported member rests.

5. In combination, a supporting frame, a body to be supported thereon, a plurality of dependent legs projecting from the supported body, each leg terminating in a lateral flange disposed in parallel relation with the plane of the supporting frame, but spaced therefrom, a cushioning member filling such space, and means to anchor the dependent legs to the supporting frame.

6. An elastic shock absorbing support for mounting a body upon a main frame comprising a bracket arm, one end of which is rigidly secured to the body, the other end provided with a lateral vertically disposed flange, a retainer, open at its top and side to receive the vertical flange and resting on the main frame, said retainer being sufficiently larger than the bracket arm flange as to leave a space therebetween, an elastic material completely filling the space whereby the supporting arm is resiliently supported and cushioned.

7. In a motor vehicle a combination of the channel shaped chassis frame member and an engine to be supported thereby, with a laterally extending arm on the engine having a vertical flange at the outer margin thereof, a strip of non-metallic elastic material looped about the bottom of said flange and extending on either side thereof, a U- shaped retainer for said elastic material resting on the bottom flange of the channel frame member, a block of vibration absorbing material interposed between the vertical web of the channel frame member inside of the retainer, and means to hold said flange in assembled relation.

8. In a motor vehicle the combination of a channel chassis frame member and an engine to be supported thereby, with a laterally extending arm from the engine having vertical flange at the outer margin thereof, a strip of non-metallic elastic material looped about the bottom of said flange and extending upwardly on either side thereof, the retainer for said strip supported on the lower flange of the channeled frame member, a block of vibration absorbing material interposed between the side of said retainer and the vertical web of the channeled frame member, and a fastening bolt passing horizontally through openings in said parts, the opening in said flange being of greater diameter than the bolt to afford a limited freedom of vertical movement of the engine in respect to the frame.

In testimony whereof I affix my signature.

EDWIN P. HILL.